United States Patent
Millhouse et al.

(10) Patent No.: US 10,796,287 B2
(45) Date of Patent: Oct. 6, 2020

(54) SYSTEMS AND METHODS FOR PROCESSING TRAILER REPAIR REQUESTS SUBMITTED BY CARRIERS

(71) Applicant: Walmart Apollo, LLC, Bentonville, AR (US)

(72) Inventors: Andrew B. Millhouse, Gilbert, AZ (US); Timothy J. Burleson, Bentonville, AR (US); John S. Meredith, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 433 days.

(21) Appl. No.: 15/883,816

(22) Filed: Jan. 30, 2018

(65) Prior Publication Data

US 2018/0247279 A1    Aug. 30, 2018

Related U.S. Application Data

(60) Provisional application No. 62/464,563, filed on Feb. 28, 2017.

(51) Int. Cl.
*G06Q 30/00* (2012.01)
*G06Q 10/00* (2012.01)
(Continued)

(52) U.S. Cl.
CPC .......... *G06Q 10/20* (2013.01); *G06F 3/0482* (2013.01); *G06Q 30/0633* (2013.01)

(58) Field of Classification Search
None
See application file for complete search history.

(56) References Cited

U.S. PATENT DOCUMENTS 6,308,120 B1   10/2001   Good
2007/0179868 A1   8/2007   Bozym
(Continued)

FOREIGN PATENT DOCUMENTS

JP   2005071180   3/2005
JP   2015103187   6/2015

OTHER PUBLICATIONS

PCT; App. No. PCT/US2018/014990; International Search Report and Written Opinion dated Apr. 12, 2018.

*Primary Examiner* — Mila Airapetian
(74) *Attorney, Agent, or Firm* — Fitch, Even, Tabin & Flannery, LLP

(57) ABSTRACT

In some embodiments, methods and systems are provided for facilitating submission of repair requests by carriers having to repair trailers to domicile facilities associated with the trailers. A central computing device provides a first graphical interface accessible by a computing device of a carrier having to repair a trailer in order to permit the carrier to submit a repair request indicating repair needed for the trailer. The central computing device then generates an invoice for the repair to the trailer directed to a domicile facility associated with the trailer. The central computing device also transmits an alert including the invoice to a computing device of the domicile facility associated with the trailer, receives a response from the computing device of the domicile facility associated with the trailer, and transmits a notification indicating whether the repair request has been approved by the domicile facility associated with the trailer.

20 Claims, 6 Drawing Sheets

(51) Int. Cl.
*G06F 3/0482* (2013.01)
*G06Q 30/06* (2012.01)

(56) References Cited

U.S. PATENT DOCUMENTS

| | | |
|---|---|---|
| 2008/0046261 A1 | 2/2008 | Cunningham |
| 2008/0059272 A1 | 3/2008 | Jeanneret |
| 2011/0087505 A1 | 4/2011 | Terlep |
| 2014/0019280 A1 | 1/2014 | Medeiros |
| 2014/0067666 A1 | 3/2014 | McClintic |
| 2014/0088866 A1* | 3/2014 | Knapp ............... G06Q 10/06 701/467 |
| 2015/0100505 A1 | 4/2015 | Binion |
| 2015/0286994 A1 | 10/2015 | Elder |
| 2016/0019497 A1 | 1/2016 | Carvajal |

\* cited by examiner

FIG. 4

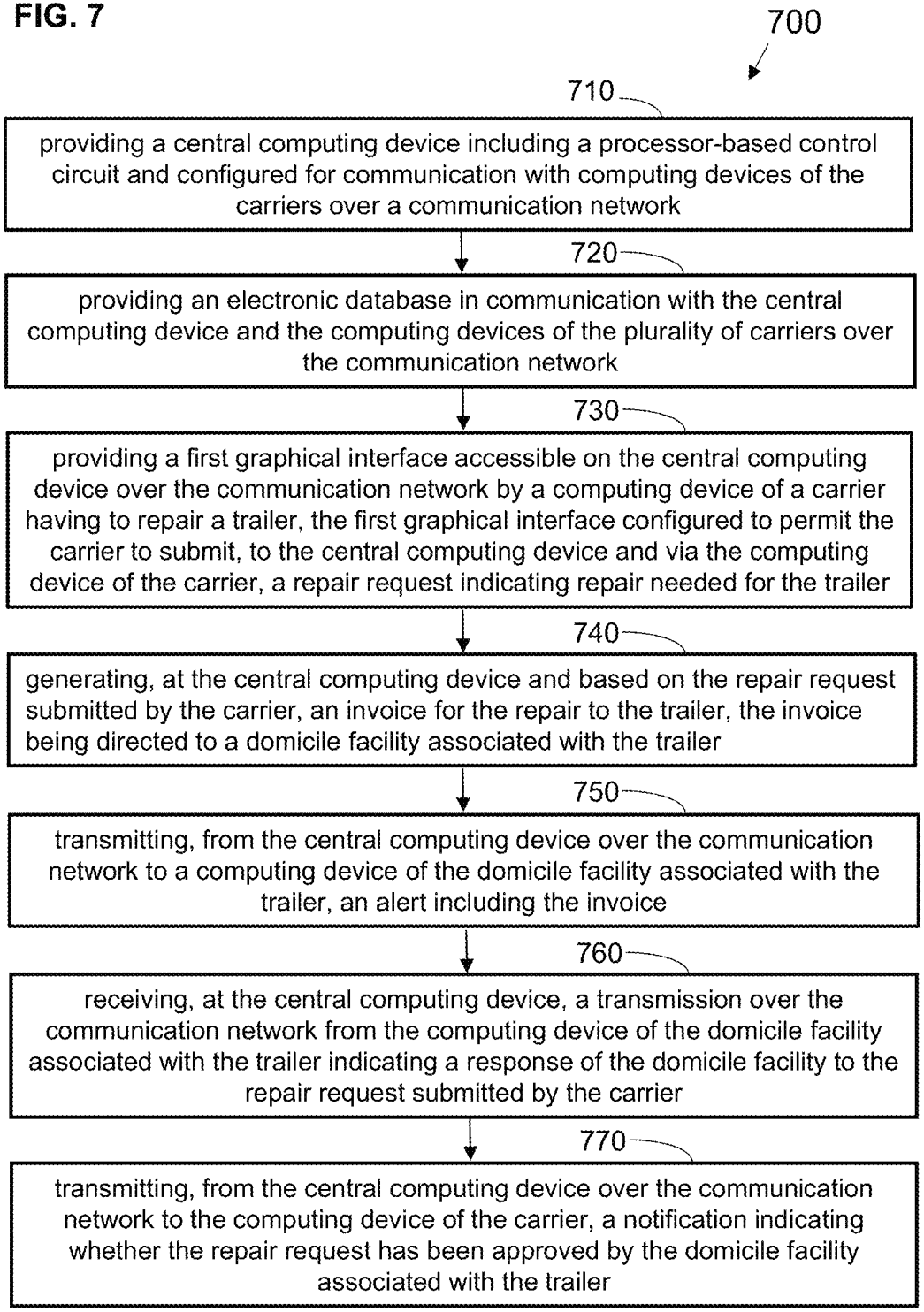

SYSTEMS AND METHODS FOR PROCESSING TRAILER REPAIR REQUESTS SUBMITTED BY CARRIERS

CROSS-REFERENCE TO RELATED APPLICATIONS

This application claims the benefit of U.S. Provisional Application No. 62/464,563, filed Feb. 28, 2017, which is incorporated herein by reference in its entirety.

TECHNICAL FIELD

This invention relates generally to managing trailer repair and, in particular, to processing trailer repair requests submitted by carriers.

BACKGROUND

Carriers that haul loads of products between various facilities of a retailer typically use leased trailers. The trailers are typically leased from a trailer leasing agency by a retailer, assigned to trailer domicile facilities of carriers who haul loads for the retailer using the trailers, and returned to the trailer leasing agency by the retailer in an agreed upon condition upon the conclusion of the lease. Trailers sometimes break down and require repairs during use by the carriers. Generally, when a trailer is within a predetermined time period of being returned to the trailer leasing agency, the trailer can be returned to a trailer domicile facility of the carrier in order to perform any repairs necessary to bring the trailer to the turn-in condition agreed upon between the retailer and the trailer leasing agency. Any repair not completed before turning the trailer in to the trailer leasing agency becomes the financial responsibility of the retailer. This undesirably leads to situations, where the retailer ends up paying for repairs to trailer problems that occurred while the carrier was using the trailer to transport loads for the retailer, and which should have been the responsibility of the carrier and should have been repaired at the trailer domicile facility before the trailer was turned in to the trailer leasing agency.

BRIEF DESCRIPTION OF THE DRAWINGS

Disclosed herein are embodiments of systems, apparatuses, methods, and systems pertaining to facilitating submission of repair requests by carriers having to repair trailers to domicile facilities associated with the trailers. This description includes drawings, wherein:

FIG. 4 is a screen shot of a portion of an exemplary first graphical interface of the system of FIG. 1 in accordance with some embodiments;

FIG. 7 is a flow chart diagram of a process of facilitating submission of repair requests by carriers having to repair trailers to domicile facilities associated with the trailers in accordance with some embodiments.

Figure 1:
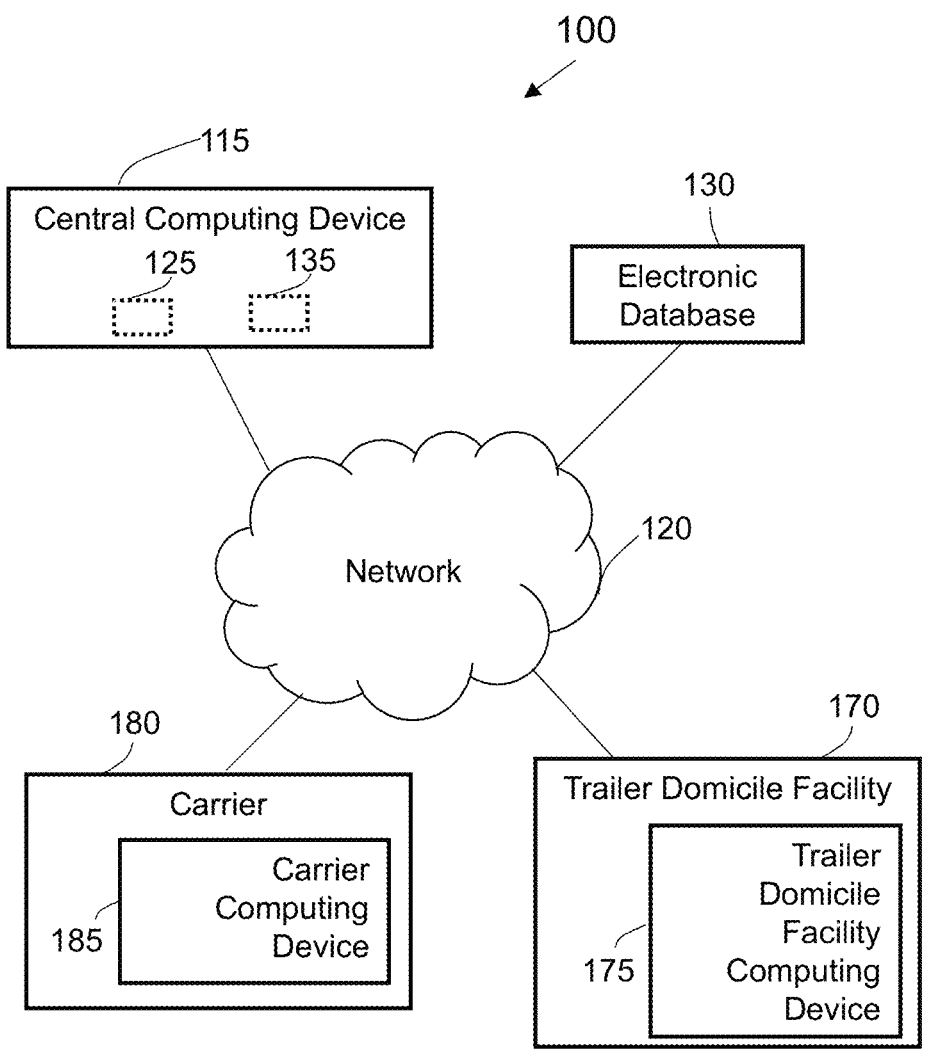
FIG. 1 is a diagram of a system of for facilitating submission of repair requests by carriers having to repair trailers to domicile facilities associated with the trailers in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for facilitating submission of repair requests by carriers having to repair trailers to domicile facilities associated with the trailers. A central computing device provides a graphical interface accessible by a computing device of a carrier having to repair a trailer in order to permit the carrier to submit a repair request indicating repair needed for the trailer. The central computing device then generates an invoice for the repair to the trailer directed to a domicile facility associated with the trailer. The central computing device also transmits an alert including the invoice to a computing device of the domicile facility associated with the trailer, receives a response from the computing device of the domicile facility associated with the trailer, and transmits a notification indicating whether the repair request was approved by the trailer domicile facility.

In some embodiments, a system for facilitating submission of repair requests by carriers having to repair trailers to domicile facilities associated with the trailers includes a central computing device including a processor-based control circuit and configured for communication with computing devices of the carriers over a communication network and an electronic database in communication with the central computing device and the computing devices of the plurality of carriers over the communication network. The central computing device is configured to provide a first graphical interface accessible on the central computing device over the communication network by a computing device of a carrier having to repair a trailer. The first graphical interface is also configured to permit the carrier to submit, to the central computing device and via the computing device of the carrier, a repair request indicating repair needed for the trailer. The central computing device is further configured to: generate, based on the repair request submitted by the carrier, an invoice for the repair to the trailer that is directed to a domicile facility associated with the trailer; transmit an alert including the invoice over the communication network to a computing device of the domicile facility associated with the trailer; receive from the computing device of the domicile facility associated with the trailer and over the communication network, a response of the domicile facility to the repair request submitted by the carrier; and transmit, over the communication network to the computing device of the carrier, a notification indicating whether the repair request has been approved by the domicile facility associated with the trailer.

In some embodiments, a method for facilitating submission of repair requests by carriers having to repair trailers to domicile facilities associated with the trailers includes: providing a central computing device including a processor-based control circuit and configured for communication with computing devices of the carriers over a communication network; providing an electronic database in communication with the central computing device and the computing devices of the plurality of carriers over the communication network; providing a first graphical interface accessible on the central computing device over the communication network by a computing device of a carrier having to repair a trailer and configured to permit the carrier to submit, to the central computing device and via the computing device of the carrier, a repair request indicating repair needed for the trailer; generating, at the central computing device and based on the repair request submitted by the carrier, an invoice for the repair to the trailer that is directed to a domicile facility associated with the trailer; transmitting, from the central computing device over the communication network to a computing device of the domicile facility associated with the trailer, an alert including the invoice; receiving, at the central computing device, a transmission over the communication network from the computing device of the domicile facility associated with the trailer indicating a response of the domicile facility to the repair request submitted by the carrier; and transmitting, from the central computing device over the communication network to the computing device of the carrier, a notification indicating whether the repair request has been approved by the domicile facility associated with the trailer.

FIG. 1 shows an embodiment of a system 100 for system for facilitating submission of repair requests, by carriers 180 having to repair trailers 190, to domicile facilities 170 associated with the trailers 190. A carrier 180 will be understood to mean any entity that transports loads via the trailers 190 for a retailer. A retailer will be understood to mean any entity operating as a brick-and-mortar physical store and/or a website by way of which products may be ordered by customers. A trailer domicile facility 170 will be understood to mean a facility of the carrier 180 that is assigned to the trailers 190 used by the carriers 180 when hauling loads. Exemplary loads that may be transported by carriers 180 may include, but are not limited to, general-purpose customer goods, as well as consumable products, such as medications, food items, and dietary supplements.

The system 100 depicted in FIG. 1 includes a central computing device 115, which may be implemented as one computer/server at one facility of the retailer (e.g., data warehouse, etc.), or as multiple interconnected computers/servers stored at multiple facilities. In some embodiments, the central computing device 115 is a stationary or portable electronic device, for example, a desktop computer, a laptop computer, a tablet, a mobile phone, or any other electronic device including a processor-based control circuit (i.e., control unit). In the embodiment of FIG. 1, the central computing device 115 is configured for data entry and processing as well as for communication with other devices of system 100 via a network 120.

The network 120 may be a wide-area network (WAN), a local area network (LAN), a personal area network (PAN), a wireless local area network (WLAN), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, as will be described below, the central computing device 115 is configured to access an electronic database 130 and/or communicate with a carrier computing device 185 and/or communicate with a trailer domicile facility computing device 175 via the network 120 to facilitate the submission and/or processing of a repair request to a domicile facility 170 associated with a trailer 190 that is submitted by a carrier 180 having to repair trailer 190.

In the embodiment of FIG. 1, the central computing device 115 is coupled to an electronic database 130. In some embodiments, the electronic database 130 may be configured to store information associated with the repair requests for trailers 190 that are submitted by carriers 180 to respective trailer domicile facilities 170 associated with such trailers 190. Generally, the electronic database 130 stores electronic information including but not limited to information associated with the carriers 180 and trailers 190 in use by the carriers 180 to transport loads, as well as information associated with trailer domicile facilities 170 and the trailer repair requests submitted by the carriers 180 to the trailer domicile facilities 170. The electronic database 130 may be stored, for example, on non-volatile storage media (e.g., a hard drive, flash drive, or removable optical disk) internal or external to the central computing device 115, or internal or external to computing devices separate and distinct from the central computing device 115. It will be appreciated that the electronic database 130 may likewise be cloud-based. While the central computing device 115 is shown in FIG. 1 in communication over the network 120 with one electronic database (i.e., database 130), it will be appreciated that the central computing device 115 may be coupled via the network 120 to two or more electronic databases.

In some embodiments, a carrier 180 is permitted to set up an account for use in submitting repair requests for trailers 190 used by the carrier 180. In one aspect, when a carrier 180 initially sets up an online account, the system 100 (e.g., central computing device 115) is configured to permit the carrier 180 to generate a carrier profile including information of the carrier 180 (e.g., name, address, other identifying information (e.g., Standard Carrier Alpha Code (SCAS)), phone number, financial information (e.g., bank account information), and the like). In some embodiments, the information associated with the carriers 180 is stored in the electronic database 130 for subsequent retrieval by the central computing device 115 (e.g., in response to a repair request for a trailer 190 submitted by the carrier 180).

A carrier 180 may access the central computing device 115 over the network 120 via a carrier computing device 185, which may be a stationary, portable, and/or hand-held electronic device, for example, a desktop computer, a laptop computer, a tablet, a mobile phone, or any other electronic, processor-based device configured for data entry and communication with the central computing device 115. In some aspects, as the carrier 180 is connecting over the network 120 to the central computing device 115, the central computing device 115 may request a verification of the identity (e.g., username/password) of the carrier 180. The central computing device 115 may first verify the identity of the carrier 180 (e.g., by comparing the username/password data entered by the carrier 180 into the login interface against username/password data in the profile of the carrier 180 stored in the electronic database 130). The central computing device 115 may then associate the profile of the carrier 180 with the identity of the carrier 180, retrieve carrier account information stored in the profile and enable the carrier 180 to log in to the central computing device 115.

In some aspects, the central computing device 115 is configured to enable the carriers 180 to enter electronic data pertaining to repair requests, for one or more trailers 190 used by the carriers 180 when hauling loads, to the trailer domicile facilities 170 associated with such trailers 190. As mentioned above, the trailer domicile facility 170 can be operated by the carrier 180 (or by a third party for the carrier 180). In one aspect, the central computing device 115 is configured to generate a first graphical interface 125 accessible by the carriers 180 via carrier computing devices 185 that are logged in to the central computing device 115. In some embodiments, the graphical interface 125 is configured to permit the carriers 180 to submit their trailer repair requests without having to log in to the central computing device 115. For example, first graphical interface 125 can be an internet-based form having a defined uniform resource locator (URL) address and being accessible via an internet browser of the carrier computing device 185, or can be generated within a mobile application (app) installed on the carrier computing device 185.

Figure 3:
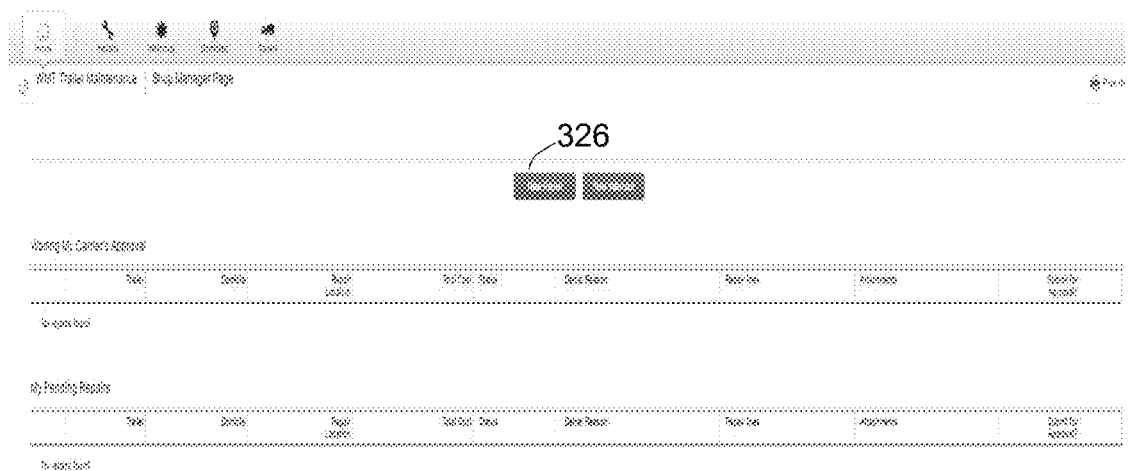
FIG. 3 is a screen shot of a portion of an exemplary first graphical interface of the system of FIG. 1 in accordance with some embodiments.
Figure 4:
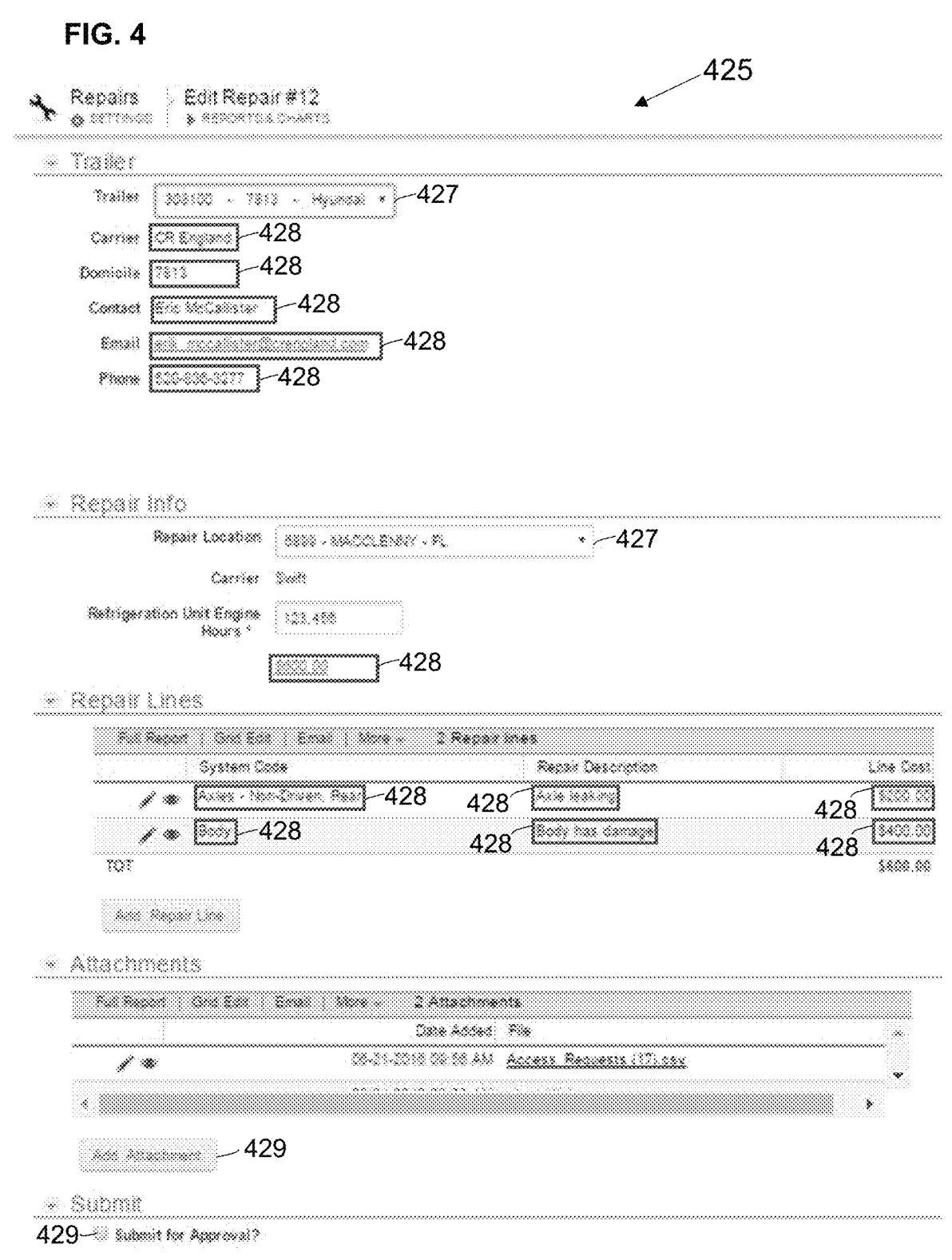

A portion of an exemplary first graphical interface 325 is illustrated in FIG. 3 and another portion of an exemplary first graphical interface 425 is illustrated in FIG. 4. The first graphical interface 325 of FIG. 3 includes a clickable graphical field 326 (i.e., "New Repair" button) that permits a carrier 180 to enter electronic data relating to a repair request submitted by the carrier 180 for a given trailer 190 to a trailer domicile facility 170 associated with that trailer 190. For example, after a trailer 190 being used by a carrier 180 to haul a load breaks down and/or otherwise requires repair, the carrier 180 can obtain a repair estimate from a trailer repair facility, and then log in to the central computing device 115 to submit the repair request to the domicile facility 170 associated with the trailer 170. In one aspect, after an operator of a carrier computing device 185 logs in to the central computing device 115, the first graphical interface 425 is generated by the central computing device 115 and displayed on the screen of the carrier computing device 185, enabling the operator of the carrier computing device 185 to click on the graphical button 326 in order to bring up another portion of the first graphical interface 525 on the screen of the carrier computing device 185, where the operator of the carrier computing device 185 can enter all information relevant to the repair request being submitted by the carrier 180.

In the embodiment illustrated in FIG. 4, the first graphical interface 425 enables the operator of the carrier computing device 185 to specify various parameters relating to the repair request. With reference to FIG. 4, the carrier 180 may use the carrier computing device 185 to enter, via one or more of the editable fields of the exemplary first graphical interface 425, electronic data including but not limited to: trailer identifying information; carrier identifying information; trailer domicile facility number; carrier contact name, carrier email address, carrier contact phone number; repair location identifying information; repair identifying information (e.g., damaged parts/components repaired and/or broken parts/components replaced); dollar amount per each repair/replacement; day/time when estimate for repair/replacement was obtained.

For example, the first graphical interface 425 of FIG. 4 includes a "Trailer" section including a drop-down menu field 427, where the operator of the carrier computing device 185 can specify the identity of the trailer 190 for which the repair request is being submitted. The first graphical interface 425 also includes text input fields 428, where the operator of the carrier computing device 185 can insert the information that identifies the carrier 180, trailer domicile facility 170, as well as carrier contact name, email address, and phone number. The first graphical interface 425 also includes a "Repair Info" section including a drop-down menu field 427, where the operator of the carrier computing device 185 can specify the identity of the repair facility where the estimate for repairs to the trailer 190 was obtained, and a text input field 428, where the operator of the carrier computing device 185 can specify the amount of the repairs made.

In addition the first graphical interface 425 of FIG. 4 includes a "Repair Lines" section including text input fields 428, where the operator of the carrier computing device 185 can specify, line by line, each repair that the carrier 180 obtained an estimate for from the repair facility. The first graphical interface 425 of FIG. 4 further includes an "Attachments" section including a clickable graphical button 426 that enables the operator of the carrier computing device 185 to upload an electronic copy of the estimate obtained by the carrier 180 from the repair facility. The first graphical interface 425 of FIG. 4 further includes a clickable graphical button 426 that enables the operator of the carrier computing device 185 to submit the repair request to the central computing device 115. It will be appreciated that the first graphical interface 425 shown in FIG. 4 is shown by way of example only, and that the locations, sizes, and types of fields shown as part of the first graphical interface 425 as exemplary and can be reconfigured in other embodiments.

In some embodiments, the first graphical interface 425 is configured to permit the carrier 180 to submit the repair request only if the repair request is for a monetary amount that exceeds a predetermined threshold. In one aspect, the first graphical interface 425 is configured such that the graphical button 426 that causes the repair request to be submitted is only clickable by the operator of the carrier computing device 185 when the repair request is for a monetary amount that exceeds a predetermined monetary threshold. The predetermined threshold may be any monetary amount considered by the carrier 180 and/or trailer domicile facility 170 to be a significant repair to the trailer 190, for example, $100, $200, $300, $400, $500, $750, $1000, etc.

Figure 2:
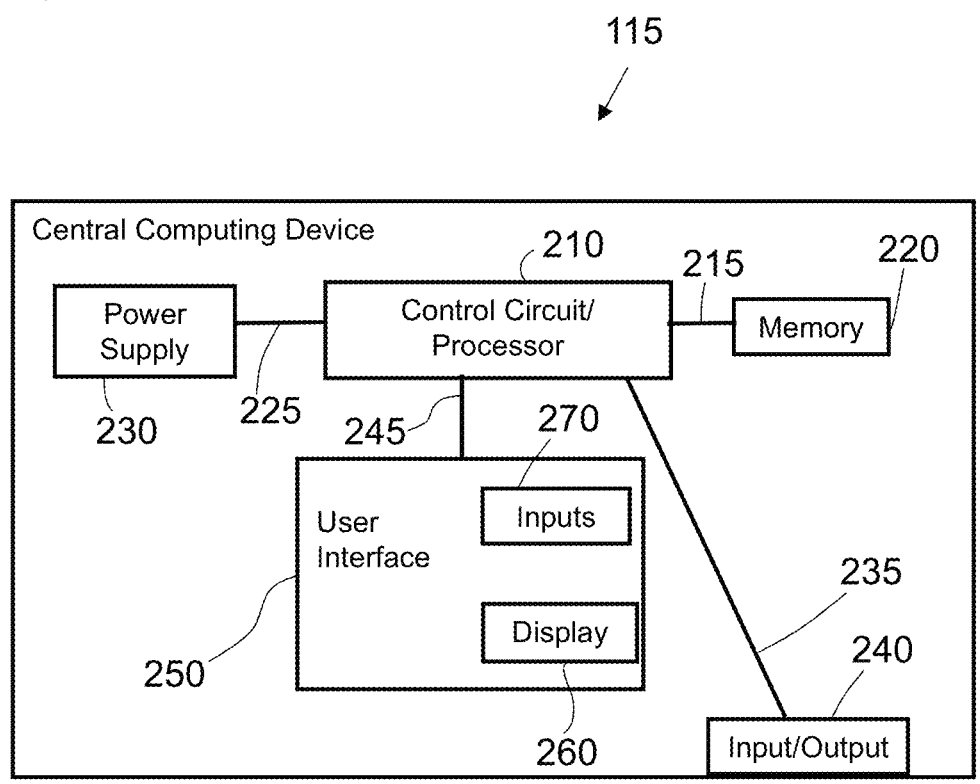
FIG. 2 is a functional diagram of an exemplary central computing device usable with the system of FIG. 1 in accordance with some embodiments.

With reference to FIG. 2, an exemplary central computing device 115 configured for use with the systems and methods described herein may include a control circuit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control unit 210 of the central computing device 115 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the central computing device 115 is electrically coupled via a connection 235 to an input/output 240 that can receive signals from electronic devices in communication over the network 120 with the central computing device 115 (e.g., data from the carrier computing device 185 relating to a repair request being submitted by the carrier 180, data from the trailer domicile facility computing device 175 indicating a response to (e.g., approval or denial) the repair request submitted by the carrier 180, etc.). The input/output 240 of the central computing device 115 can also send signals to electronic devices in communication over the network 120 with the central computing device 115 (e.g., carrier-submitted data relating to a repair request to the electronic database 130, trailer domicile facility 170-uploaded data responsive to a repair request to electronic database 130, etc.).

In the embodiment shown in FIG. 2, the processor-based control unit 210 of the central computing device 115 is electrically coupled via a connection 245 to a user interface 250, which may include a visual display or display screen 260 (e.g., LED screen) and/or button input 270 that provide the user interface 250 with the ability to permit an operator of the central computing device 115 to manually control the central computing device 115 by inputting commands via touch-screen and/or button operation and/or voice commands. It will be appreciated that the performance of such functions by the processor-based control unit 210 of the central computing device 115 is not dependent on a human operator, and that the control unit 210 may be programmed to perform such functions without a human operator.

In some embodiments, the display screen 260 of central computing device 115 is configured to display various graphical interface-based menus, options, and/or notifications/alerts that may be transmitted to the central computing device 115 and displayed on the display screen 260 in connection with various aspects of the repair requests submitted by the carriers 180 and approvals/denials by the trailer domicile facilities 170. The inputs 270 of the central computing device 115 may be configured to permit an operator to navigate through the on-screen menus on the central computing device 115. It will be appreciated that the display screen 260 may be configured as both a display screen and an input 270 (e.g., a touch-screen that permits an operator to press on the display screen 260 to enter text and/or execute commands.)

As discussed above, in some aspects, the control circuit 210 of the central computing device 115 is programmed to generate a first graphical interface 125 accessible on the central computing device 115 over the communication network 120 by a computing device 185 of a carrier 180 having to repair a trailer 190. As discussed above, this first graphical interface 425 is configured (e.g., by including clickable graphical buttons 426, drop-down menus 427, and text input fields 428) to permit the carrier 180, via the carrier computing device 185, to submit one or more trailer repair requests. In some embodiments, after a repair request is submitted by the carrier 180 as discussed above, the control circuit 210 of the central computing device 115 is programmed to process and/or extract the information submitted in the repair request, and to cause the central computing device 115 to transmit the information extracted from the repair request submitted by the carrier 180 to the electronic database 130 for storage and/or future retrieval by the central computing device 115 (e.g., to determine most often occurring repairs required by trailers 190).

In one aspect, after the control circuit 210 processes the electronic information submitted by the carrier 180 via the first graphical interface 425 as part of a repair request for a trailer 190, the control circuit 210 is programmed to generate an invoice directed to the trailer domicile facility 170 associated with that trailer 190, with the invoice to the trailer domicile facility 170 reflecting the repair to the trailer 190 indicated in the repair request submitted by the carrier 180. In some embodiments, after the control circuit 210 of the central computing device 115 processes the repair request for a trailer 190 submitted by the carrier 180 and generates an invoice to the trailer domicile facility 170 associated the trailer 190, the control circuit 210 of the central computing device 115 is programmed to transmit (over the network 120) a signal including an electronic alert or notification to the computing device 175 of the trailer domicile facility 170.

In some aspects, the electronic notification sent by the central computing device 115 over the network 120 to the trailer domicile carrier computing device 175 includes but is not limited to a short message service (SMS) message, an electronic mail (e-mail) message, an instant messenger message, and/or a push notification. The electronic notification, when received by the computing device 175 of the trailer domicile facility 170, indicates to the trailer domicile facility 170 that a repair request for one of the trailers 190 domiciled at this facility has been submitted by a carrier 180. As will be described in more detail below, in some embodiments, after a trailer domicile facility 170 receives a notification of a repair request for a trailer 190 submitted by a carrier 180, the trailer domicile facility 170 can log in to the central computing device 115.

In some embodiments, when a trailer domicile facility 170 initially sets up an online account, the system 100 (e.g., central computing device 115) is configured to permit the trailer domicile facility 170 to generate a carrier profile including information of the trailer domicile facility 170 (e.g., name, address, other identifying and/or contact (e.g., phone, email, etc.) information), financial information (e.g., bank account information), and identifying information for each trailer 190 associated with the trailer domicile facility 170). Again, since the trailer domicile facility 170 is in some aspects operated by the carrier 180, some of the identifying information associated with the carrier 180 and the trailer domicile facility 170 may overlap. In some embodiments, all information associated with the trailer domicile facilities 170 is stored in the electronic database 130 for subsequent retrieval by the central computing device 115 (e.g., when the control circuit 210 receives and/or processes a trailer repair request).

A trailer domicile facility 170 may access the central computing device 115 over the network 120 via a trailer domicile facility computing device 175, which may be a stationary, portable, and/or hand-held electronic device, for example, a desktop computer, a laptop computer, a tablet, a mobile phone, or any other electronic, processor-based device configured for data entry and communication with the central computing device 115. In some aspects, as the trailer domicile facility 170 is connecting over the network 120 to the central computing device 115 via the trailer domicile facility computing device 175, the central computing device 115 may request a verification of the identity (e.g., username/password) of the trailer domicile facility 170. The central computing device 115 may first verify the identity of the trailer domicile facility 170 (e.g., by comparing the username/password data entered by the trailer domicile facility 170 into the login interface against username/password data in the profile of the trailer domicile facility 170 stored in the electronic database 130). The central computing device 115 then associates the profile of the trailer domicile facility 170 with the identity of the trailer domicile facility 170, retrieves trailer domicile facility account information stored in the profile, and enables the carrier computing device 185 to log in to the central computing device 115.

In some embodiments, after the trailer domicile facility computing device 175 is permitted to log in to the central computing device 115, the operator (e.g., employee or manager) of the trailer domicile facility 170 is permitted to browse through a listing of repair requests submitted by drivers of a carrier 180 to that trailer domicile facility 170 in order to view the repair request, and to either approve or deny the repair request. In some aspects, after the operator of the trailer domicile facility 170 logs in to the central computing device 115 in response to a notification of a repair request, the control circuit 210 of the central computing device 115 is programmed to generate (and present on a display screen of the trailer domicile facility computing device 175) a second graphical interface 535 shown in FIG. 5. Similarly to the first graphical interface 125, 325, 425, the second graphical interface 135, 535, 635, can be an internet-based form accessible by the carriers 180 via a trailer domicile facility computing device 175 logged in to the central computing device 115. In some embodiments, instead of being an internet-based form having a defined uniform resource locator (URL) address and accessible via an internet browser of the trailer domicile facility computing device 175, the second graphical interface 535 can be generated within a mobile application (app) installed on the trailer domicile facility computing device 175.

Figure 5:
FIG. 5 is a screen shot of a portion of an exemplary second graphical interface of the system of FIG. 1 in accordance with some embodiments.
Figure 6:
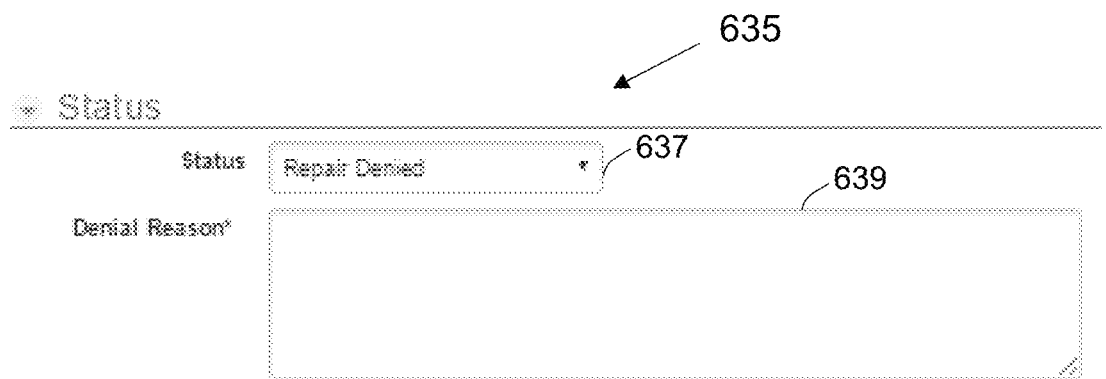
FIG. 6 is a screen shot of a portion of an exemplary second graphical interface of the system of FIG. 1 in accordance with some embodiments.

A portion of an exemplary second graphical interface 535 and 635 is illustrated in FIGS. 5 and 6, respectively. Notably, in order to permit the operator of the trailer domicile facility computing device 175 to review the repair request, the second graphical interface 535, 635 can include either the entire first graphical interface 435 (where the carrier 180 entered the repair request information), or text fields indicating the information extracted by the control circuit 210 of the central computing device 115 from the repair request submitted by the carrier 180.

The exemplary second graphical interface 535, 635 of FIGS. 5-6 includes a drop-down menu field 537, 637 that permits the operator of the trailer domicile facility computing device 175 to approve or deny the repair request submitted by the carrier 160. For example, FIG. 5 shows a scenario, where the operator of the trailer domicile facility computing device 175 approved the repair request, and FIG. 6 illustrates a scenario, where the operator of the trailer domicile facility computing device 175 denied the repair request. The exemplary second graphical interface 535 shown in FIG. 5 further includes a text input field 539 that permits the operator of the trailer domicile facility computing device 175 to enter a reference number of the approved repair request. The exemplary second graphical interface 635 shown in FIG. 6 further includes a text input field 639 that permits the operator of the trailer domicile facility computing device 175 to type in reasons indicating why the repair request was denied.

In some embodiments, after the operator of the trailer domicile facility computing device 175 responds to the repair request of the carrier 160 by approving the repair request via the second graphical interface 535 as described above, the central computing device 115 receives this response over the network 120 from the trailer domicile facility computing device 175, the control circuit 210 of the central computing device 115 is programmed to record this approval-indicating response in the electronic database 130, and to cause the central computing device 115 to transmit to a carrier computing device 185, an electronic notification or alert over the network 120 indicating to the carrier 180 that the repair request has been approved by the trailer domicile facility 170. In one aspect, the electronic notification transmitted from the central computing device 115 to the carrier computing device 185 includes an electronic document (e.g., in .docx, .pdf, or xlsx format) that represents a purchase order from the trailer domicile facility 170 that covers the repairs indicated in the repair request submitted by the carrier 180 and approved by the operator of the trailer domicile facility computing device 175.

In some aspects, after the trailer domicile facility 170 approves the repair request, and after the carrier 180 is provided with a purchase order covering the repairs as described above, and after the carrier 180 proceeds with repairing the trailer 190, the carrier 180 is permitted to log in to the central computing device 115 in order to indicate that the repairs approved by the carrier domicile facility 170 have been made to the trailer 190 at a repair facility initially indicated in the repair request submitted by the carrier 180. In one aspect, after receiving a notification from the carrier 180 indicating that the repairs have been made, the control circuit 210 of the central computing device 115 is programmed to access the electronic database 130 over the communication network 120, retrieve the repair request stored in the electronic database 130 in association with the trailer 190, and generate a report indicating the repairs made to the trailer 190. In one aspect, the control circuit 210 of the central computing device 115 is programmed to include in the report an identification of each facility where repairs to the trailer 190 were made, each carrier facility where the trailer 190 stopped, and the trailer domicile facility 170 of the trailer 190.

In some embodiments, after the operator of the trailer domicile facility computing device 175 responds to the repair request of the carrier 160 by denying the repair request via the second graphical interface 635 as described above, and after the central computing device 115 receives this response over the network 120 from the trailer domicile facility computing device 175, the control circuit 210 of the central computing device 115 is programmed to record this denial-indicating response in the electronic database 130, and to cause the central computing device 115 to transmit (e.g., over the network 120) to a computing device 185 of the carrier 180, an electronic notification or alert indicating to the carrier 180 that the repair request has been denied by the trailer domicile facility 170. In one aspect, the electronic notification or alert transmitted from the central computing device 115 to the carrier computing device 185 includes an electronic document (e.g., in .docx, .pdf, or xlsx format) that represents the written justification submitted by the trailer domicile facility 170 that provides the reasons indicating why the repair request submitted by the carrier 180 was denied by the trailer domicile facility 170.

FIG. 5 shows an embodiment of an exemplary method 700 of facilitating submission of repair requests by carriers 180 having to repair trailers 190 to domicile facilities 170 associated with the trailers 190. The method 700 includes providing a central computing device 115 including a processor-based control circuit 210 and configured for communication with computing devices of the carriers 180 over a communication network 120 (step 710). In addition, the method 700 of FIG. 7 includes providing an electronic database 130 in communication with the central computing device 115 and the computing devices 185 of the plurality of carriers 180 over the communication network 120 (step 720).

As described above, in some embodiments, carriers 180 are permitted to submit repair requests for trailers 190 associated with trailer domicile facilities 170. In one aspect, as discussed above, the method 700 includes, providing a first graphical interface 435 accessible on the central computing device 115 over the communication network 120 by a computing device 185 of a carrier 180 having to repair a trailer 190, such that the first graphical interface 435 is configured to permit the carrier 180 to submit, to the central computing device 115 and via the carrier computing device 185, a repair request indicating the repair needed for the trailer 190 (step 730). Portions of exemplary first graphical interface 325, 425 are illustrated in FIGS. 3 and 4, respectively, and have been discussed in more detail above.

As discussed above, in one aspect, the method 700 includes processing, via the control circuit 210 of the central computing device 115, the repair request received by the central computing device 115 from the carrier computing devices 185. In the embodiment of FIG. 7, after the control circuit 210 of the central computing device 115 processes the information submitted by the carrier 180 in the repair request, the method 700 further includes generating, at the central computing device 115, and based on the repair request submitted by the carrier 180, an invoice directed to a domicile facility 170 associated with the trailer 190 and reflecting the repairs indicated in the repair request submitted by the carrier 180 with respect to the trailer 190 (step 740).

After the invoice for estimated repairs to the trailer 190 is generated at the central computing device 115, the exemplary method 700 of FIG. 7 further includes transmitting, from the central computing device 115 over the communication network 120 to a computing device 175 of the domicile facility 170 associated with the trailer 190, an alert including the invoice (step 750). As discussed above, the electronic alert or notification sent by the central computing device 115 over the network 120 to the trailer domicile facility computing device 175 can include but is not limited to a short message service (SMS) message, an electronic mail (e-mail) message, an instant messenger message, and/or a push notification.

After the trailer domicile facility 170 receives a notification from the central computing device 115 indicating that a carrier 180 has filed a repair request with respect to a trailer 190 associated with a trailer domicile facility 170, the trailer domicile facility 170 is permitted to log in to the central computing device 115, review the repair request, and approve or deny the repair request via an exemplary second graphical interface 535, 635, which was described in more detail above with reference to FIGS. 5 and 6. To that end, the method 700 of FIG. 7 includes receiving, at the central computing device 115, a transmission over the communication network 120 from the computing device 175 of the domicile facility 170 associated with the trailer 190 indicating a response of the trailer domicile facility 170 to the repair request submitted by the carrier 180 (step 760).

In the embodiment illustrated in FIG. 7, the method 700 further includes transmitting, from the central computing device 115 over the communication network 120 to the computing device 185 of the carrier 180, a notification indicating whether the repair request has been approved by the domicile facility 170 associated with the trailer 190 (step 770). In some embodiments, after the trailer domicile facility 170 responds to the repair request of the carrier 160 by approving the repair request, the central computing device 115 records the approval-indicating response of the trailer domicile facility 170 in the electronic database 130 for record-keeping, and transmits over the network 120 an electronic notification to the carrier computing device 185 to indicate to the carrier 180 that the repair request has been approved by the trailer domicile facility 170. In one aspect, this electronic notification includes a purchase order from the trailer domicile facility 170 that covers the approved repairs indicated in the repair request submitted by the carrier 180. The carrier 180 can then use this purchase order to pay the repair facility after the repair facility performs the approved repairs to the trailer 190.

In one aspect, after the carrier 180 pays for the completed repairs to the trailer 190 at the repair facility via the purchase order provided by the trailer domicile facility 170, an operator of the carrier computing device 185 transmits a notification to the central computing device 115 over the network 120 to indicate that the repairs to the trailer 190 have been made. The central computing device 115 then accesses the electronic database 130 over the network 120, retrieves the repair request stored in the electronic database 130 in association with the trailer 190, and generates a report indicating the repairs that were made to the trailer 190 referenced in the repair request. In one aspect, the generated report includes an identification of each facility where repairs to the trailer 190 were made, each facility of the carrier 180 where the trailer 190 stopped, and the trailer domicile facility 170 associated with the trailer 190. In some aspects, such reports can be used not only as a record of repairs made by a carrier 180 with respect to a given trailer 190 during use, but also to identify common repair-requiring problems that are missed (i.e., not repaired in advance prior to returning the trailer 190 to a trailer leasing agency) by one or more carriers 180.

In some embodiments, after the trailer domicile facility 170 responds to the repair request of the carrier 160 by denying the repair request, the central computing device 115 records the denial-indicating response of the trailer domicile facility 170 in the electronic database 130, and transmits over the network 120 an electronic notification to the carrier computing device 185 to indicate to the carrier 180 that the repair request has been denied by the trailer domicile facility 170. In one aspect, the electronic notification or alert transmitted from the central computing device 115 to the carrier computing device 185 can include a written justification submitted by the trailer domicile facility 170 that provides the reasons indicating why the repair request submitted by the carrier 180 was denied by the trailer domicile facility 170.

The systems and methods described herein advantageously allow carriers to easily submit trailer repair requests to a trailer domicile facility while using the trailers to haul loads for a retailer, but also enable the trailer domicile facilities to easily review, approve and/or deny the repair requests, and provide the carrier with a purchase order for approved trailer repairs and/or a written justification for denied trailer repairs. Such systems and methods not only provide an easy to use system for carriers that haul loads for a retailer using trailers that are leased and later returned to trailer leasing agencies, but also provide a clear record of repair-requiring issues associated with the trailers and permit appropriate allocation of financial responsibility for such repairs.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating submission of repair requests by carriers having to repair trailers to domicile facilities associated with the trailers, the system comprising:
    a plurality of computing devices of a plurality of carriers, the computing devices of the carriers configured send and receive signals over a communication network;
    a plurality of computing devices of a plurality of domicile facilities associated with the trailers, the computing devices of the domicile facilities associated with the trailers configured send and receive signals over the communication network;
    a central computing device including a processor-based control circuit and configured for communication with the computing devices of the carriers and with the computing devices of the domicile facilities associated with the trailers over the communication network;
    an electronic database in communication with the central computing device, the computing devices of the plurality of carriers, and with the computing devices of the domicile facilities associated with the trailers over the communication network;
    wherein the central computing device is configured to:
        provide a first graphical interface accessible on the central computing device over the communication network by a computing device of a carrier having to repair a trailer, the first graphical interface including a plurality of drop-down menus, text input fields, and clickable graphical buttons configured to permit the carrier to submit, to the central computing device and via the computing device of the carrier, a repair request indicating repair needed for the trailer;
        generate, based on the repair request submitted by the carrier, an electronic invoice for the repair to the trailer, the electronic invoice being directed to a domicile facility associated with the trailer;
        transmit an alert including the electronic invoice over the communication network to a computing device of the domicile facility associated with the trailer;
        receive from the computing device of the domicile facility associated with the trailer and over the communication network, a response of the domicile facility to the repair request submitted by the carrier; and
        transmit, over the communication network to the computing device of the carrier, a notification indicating whether the repair request submitted by the carrier has been approved by the domicile facility associated with the trailer.

2. The system of claim 1, wherein the first graphical interface is an internet-based form, the internet-based form being accessible to the carrier having to repair the trailer without the carrier logging into the central computing device.

3. The system of claim 1, wherein the first graphical interface is configured to permit the carrier to submit the repair request only if the repair request is for a monetary amount that exceeds a predetermined threshold.

4. The system of claim 1, wherein the central computing device is configured to receive a transmission over the communication network from the computing device of the domicile facility indicating approval of the repair request by the domicile facility and including a purchase order covering the repair indicated in the approved repair request.

5. The system of claim 4, wherein the central computing device is configured to transmit, over the communication network to the computing device of the carrier, a notification indicating approval of the repair request by the domicile facility and including the purchase order.

6. The system of claim 1, wherein the central computing device is configured to receive a transmission over the communication network from the computing device of the domicile facility indicating denial of the repair request by the domicile facility and including a written justification for the denial of the repair request.

7. The system of claim 6, wherein the central computing device is configured to transmit, over the communication network to the computing device of the carrier, a notification indicating denial of the repair request by the domicile facility and including the written justification.

8. The system of claim 1, wherein the electronic database is configured to store the repair requests for the trailers submitted by carriers, and wherein the central computing device is configured to transmit the repair request submitted by the carrier from the central computing device over the communication network to the electronic database for storage.

9. The system of claim 8, wherein the central computing device is configured to:
    access the electronic database over the communication network;
    retrieve at least one repair request stored in the electronic database in association with at least one of the trailers; and
    generate a report indicating repairs made to the at least one trailer indicated in the at least one repair request.

10. The system of claim 9, wherein the central computing device is further configured to include in the report an identification of at least one of: each facility where repairs to the at least one trailer were made; each carrier facility where the at least one trailer stopped, and the domicile facility associated with the at least one trailer.

11. A method for facilitating submission of repair requests by carriers having to repair trailers to domicile facilities associated with the trailers, the method comprising:

providing a plurality of computing devices of a plurality of carriers, the computing devices of the carriers configured send and receive signals over a communication network;

providing a plurality of computing devices of a plurality of domicile facilities associated with the trailers, the computing devices of the domicile facilities associated with the trailers configured send and receive signals over the communication network;

providing a central computing device including a processor-based control circuit and configured for communication with the computing devices of the carriers and with the computing devices of the domicile facilities associated with the trailers over the communication network;

providing an electronic database in communication with the central computing device, the computing devices of the plurality of carriers, and with the computing devices of the domicile facilities associated with the trailers over the communication network;

providing a first graphical interface accessible on the central computing device over the communication network by a computing device of a carrier having to repair a trailer, the first graphical interface including a plurality of drop-down menus, text input fields, and clickable graphical buttons configured to permit the carrier to submit, to the central computing device and via the computing device of the carrier, a repair request indicating repair needed for the trailer;

generating, at the central computing device and based on the repair request submitted by the carrier, an electronic invoice for the repair to the trailer, the electronic invoice being directed to a domicile facility associated with the trailer;

transmitting, from the central computing device over the communication network to a computing device of the domicile facility associated with the trailer, an alert including the electronic invoice;

receiving, at the central computing device, a transmission over the communication network from the computing device of the domicile facility associated with the trailer indicating a response of the domicile facility to the repair request submitted by the carrier; and transmitting, from the central computing device over the communication network to the computing device of the carrier, a notification indicating whether the repair request submitted by the carrier has been approved by the domicile facility associated with the trailer.

12. The method of claim 11, wherein the first graphical interface is an internet-based form, the internet-based form being accessible to the carrier having to repair the trailer without the carrier logging into the central computing device.

13. The method of claim 11, wherein the step of providing the first graphical interface further comprises permitting the carrier to submit the repair request only if the repair request is for a monetary amount that exceeds a predetermined threshold.

14. The method of claim 11, wherein the step of receiving the transmission from the computing device of the domicile facility associated with the trailer indicating a response of the domicile facility to the repair request submitted by the carrier further comprises receiving, at the central computing device, a transmission over the communication network from the computing device of the domicile facility indicating approval of the repair request by the domicile facility and including a purchase order covering the repair indicated in the approved repair request.

15. The method of claim 14, further comprising transmitting, from the central computing device and over the communication network to the computing device of the carrier, a notification indicating approval of the repair request by the domicile facility and including the purchase order.

16. The method of claim 11, wherein the step of receiving the transmission from the computing device of the domicile facility indicating a response of the domicile facility to the repair request submitted by the carrier further comprises receiving, at the central computing device, a transmission over the communication network from the computing device of the domicile facility indicating denial of the repair request by the domicile facility and including a written justification for the denial of the repair request.

17. The method of claim 16, further comprising transmitting, from the central computing device and over the communication network to the computing device of the carrier, a notification indicating denial of the repair request by the domicile facility and including the written justification.

18. The method of claim 11, further comprising storing on the electronic database the repair requests for the trailers submitted by carriers, and wherein the step of providing the first graphical interface further comprises transmitting the repair request submitted by the carrier from the central computing device over the communication network to the electronic database for storage.

19. The method of claim 18, further comprising:

accessing the electronic database over the communication network via the central computing device;

retrieving at least one repair request stored in the electronic database in association with at least one of the trailers;

generating, via the central computing device, a report indicating repairs made to the at least one trailer indicated in the at least one repair request.

20. The method of claim 19, wherein the step of generating the report further comprises including in the report an identification of at least one of: each facility where repairs to the at least one trailer were made; each carrier facility where the at least one trailer stopped, and the domicile facility associated with the at least one trailer.

* * * * *